(12) United States Patent
Dixon

(10) Patent No.: US 9,193,522 B2
(45) Date of Patent: Nov. 24, 2015

(54) APPARATUS FOR REMOVING MATERIAL FROM A CONTAINER AND CONTAINER THEREWITH

(76) Inventor: Oliver Dixon, Derby (GB)

( * ) Notice: Subject to any disclaimer, the term of this patent is extended or adjusted under 35 U.S.C. 154(b) by 0 days.

(21) Appl. No.: 14/125,204

(22) PCT Filed: Jun. 8, 2012

(86) PCT No.: PCT/GB2012/051300
§ 371 (c)(1),
(2), (4) Date: Dec. 10, 2013

(87) PCT Pub. No.: WO2012/168730
PCT Pub. Date: Dec. 13, 2012

(65) Prior Publication Data
US 2014/0126984 A1    May 8, 2014

(30) Foreign Application Priority Data

Jun. 10, 2011 (GB) .................................. 1109682.3

(51) Int. Cl.
*B60P 1/00* (2006.01)
*B65D 88/60* (2006.01)

(52) U.S. Cl.
CPC ................. *B65D 88/60* (2013.01); *B60P 1/006* (2013.01)

(58) Field of Classification Search
CPC .......... B60P 1/006; B65D 88/60; B65G 69/08
USPC ................... 414/492, 509–11, 513, 516, 521; 100/241
See application file for complete search history.

(56) References Cited

U.S. PATENT DOCUMENTS

| 2,693,890 A | 11/1954 | Bridge |
| 3,498,485 A * | 3/1970 | Godbersen .................... 414/697 |
| 4,162,735 A * | 7/1979 | Lewis ........................... 414/514 |
| 4,492,303 A | 1/1985 | Foster |

(Continued)

FOREIGN PATENT DOCUMENTS

| DE | 2538740 A1 | 3/1977 |
| EP | 1221398 A1 | 7/2002 |
| EP | 1623871 A1 | 2/2006 |
| EP | 1801043 A2 | 6/2007 |
| GB | 1192092 A | 5/1970 |

(Continued)

OTHER PUBLICATIONS

Notification Concerning Transmittal and International Preliminary Report on Patentability dated Dec. 27, 2013, from the corresponding International Application No. PCT/GB2012/051300 filed Jun. 8, 2012.

*Primary Examiner* — Saul Rodriguez
*Assistant Examiner* — Mark Hageman
(74) *Attorney, Agent, or Firm* — Young Basile

(57) ABSTRACT

Provided is an apparatus for removing material from a reciprocating floor container. The apparatus may comprise a first member, a flexible sealing portion coupled to the first member and configured to provide a seal between the first member and the container, and a biasing arrangement configured to enable the first member to be moveably attached to a frame member. The biasing arrangement may comprise an actuation mechanism for biasing the flexible sealing portion towards the container. The actuation mechanism may comprise adjustable tension means. In some embodiments of the invention there may also be provided a system comprising a frame member and an apparatus, wherein the frame member is moveable through the container in use.

19 Claims, 4 Drawing Sheets

(56) References Cited

U.S. PATENT DOCUMENTS

| | | | |
|---|---|---|---|
| 5,314,290 A | 5/1994 | Lutz et al. | |
| 5,445,260 A * | 8/1995 | Foster | 198/750.3 |
| 6,357,578 B1 * | 3/2002 | Shelby | 198/750.2 |
| 7,510,071 B2 * | 3/2009 | Foster | 198/750.2 |
| 2010/0028114 A1 | 2/2010 | Butterfield | |

FOREIGN PATENT DOCUMENTS

| | | |
|---|---|---|
| JP | 53112837 A | 7/1983 |
| JP | 58112837 A | 7/1983 |
| NL | 1028690 C2 | 10/2006 |
| WO | 2006019697 A3 | 2/2006 |

* cited by examiner

APPARATUS FOR REMOVING MATERIAL FROM A CONTAINER AND CONTAINER THEREWITH

CROSS REFERENCE TO RELATED APPLICATION

The present application claims priority to Great Britain Patent Application No. 1109682.3, filed Jun. 10, 2011, incorporated herein in its entirety.

FIELD OF THE INVENTION

Embodiments of the present invention relate to apparatus for removing material from container. More particularly, although not exclusively they relate to apparatus for removing particulate material from a container having a so-called reciprocating floor.

BACKGROUND TO THE INVENTION

A reciprocating floor container is a container which enables a load to be removed from the container without the container being lifted. The reciprocating floor comprises a plurality of elongate and substantially horizontal slats positioned on the floor of the container. The horizontal slats can be moved along the floor by hydraulic beams. As the slats are moved along the load within the container is moved with it. Adjacent slats may move back and forth in a reciprocating manner.

As the container is not lifted a portion of the load may remain in the container. The remaining load may need to be cleaned out manually otherwise the residual material may contaminate the next load of the container. Cleaning of containers between loads reduces time and cost efficiencies.

Furthermore any material remaining within a container is typically wasted. Thus it may be necessary to fill a container with excess material in order to ensure the desired payload is delivered. Otherwise, less than the desired payload will be delivered to the recipient if a volume of material remains in the container after unloading.

It would be useful to provide an apparatus for efficiently cleaning out the load from such containers and reducing the amount of residual material remaining in such containers after the load has been emptied.

BRIEF DESCRIPTION OF VARIOUS EMBODIMENTS OF THE INVENTION

According to various, but not necessarily all, embodiments of the invention there is provided an apparatus for removing material from a container comprising: a body arranged to be located in a container to assist in the removal of material therefrom; a first member coupled to the body and having a flexible sealing portion configured to provide a seal between the first member and the container; and a biasing arrangement configured to enable the first member to be moveably attached to the body.

The biasing arrangement may comprise an actuation mechanism for biasing the flexible sealing portion towards the container.

The container is typically a vehicular container. The container may comprise a reciprocating floor container.

In some embodiments of the invention the actuation mechanism may be configured to force the sealing member against a side wall of the container. The actuation mechanism may apply a predetermined or variable biasing force to the first member. The actuation mechanism may be arranged to apply a predetermined or variable biasing force between the first member and body. The actuation mechanism may apply a biasing force to the first member of variable magnitude dependent on the angular orientation of the first member relative to the body or frontal surface thereof.

The actuation mechanism may comprise adjustable tension means.

The actuation mechanism may comprise at least one spring. In use, the spring may be held in tension by contact between the flexible sealing portion and the container.

At least a portion of the first member may be more rigid or stiffer than the flexible sealing portion. In some embodiments of the invention the first member may comprise a rigid member. The rigid member may comprise a metal, such as aluminium.

In one embodiment, the first member and flexible sealing member may be separate members, which may be coupled together. The first member and sealing member may comprise different materials. The flexible sealing member may define a peripheral edge or rim along at least one edge or portion of the first member.

In some embodiments of the invention the flexible sealing portion may comprise an elastic and/or polymeric material, such as, for example, rubber. The flexible sealing portion may be configured to provide a seal between the first member and a wall and/or floor of the container.

The first member may be hingedly mounted to the body. The first member may be arranged to pivot about a lateral edge or side of the body.

The body may have a side arranged to be spaced from a side wall of the container. The body may be arranged to be supported on the floor of the container in use.

The body may comprise a frontal surface or blade suitable for urging the material out of the container in use. The first member may be located at a lateral edge or side of the blade. A pair of the first members may be provided. In such an embodiment, each first member may be mounted at opposing lateral edges of the blade. The, or each, first member may provide a lateral extension surface at an edge of the blade, which may be hingedly mounted relative to the blade.

According to various, but not necessarily all, embodiments of the invention there is provided a system for removing material from container comprising: a body, comprising means for enabling the body to be moved through the container and means for mounting a front surface to enable the material to be urged through the container by the body; and at least one apparatus comprising, a first member, at least one flexible sealing portion coupled to the first member and configured to provide a seal between the first member and the container, wherein the first member is attached to the frame by attachment means which comprise an actuation mechanism for biasing the flexible sealing portion towards the container.

In some embodiments of the invention an apparatus may be provided at either side of the body.

In some embodiments of the invention the means for enabling the body to be moved through the container may comprise a pulley. The means for enabling the body to be moved through the container may comprise wheels coupled to the body, typically on an underside thereof.

In some embodiments of the invention the system may further comprise a load bearing member where at least a portion of the load bearing member may be configured to cover the floor of the container so that the load of the container is on top of the load bearing member. The load bearing member may be coupled to the body so that as the load is moved out of the container the body is moved with the load. The body may comprise a frame member.

In some embodiments of the invention the front surface may substantially fill the cross sectional area between the walls of the container.

In some embodiments of the invention the system may further comprise at least one additional sealing portion coupled to the body.

The material may be pushed or pulled through the container by the body.

According to various, but not necessarily all, embodiments of the invention there is provided a container comprising a system as described above. The container may be a reciprocating floor container.

According to a further aspect of the invention, there is provided an apparatus for removing material from a container comprising: a first member; a flexible sealing portion coupled to the first member configured to provide a seal between the first member and a wall of the container; and attachment means configured to enable the first member to be moveably attached to a body for urging material from the container in use, wherein the attachment means comprise adjustable tension means.

Any of the preferable features described in conjunction with any one aspect of the invention may be provided with any further aspect of the invention wherever it is practicable so to do.

BRIEF DESCRIPTION OF THE DRAWINGS

For a better understanding of various examples of embodiments of the present invention reference will now be made by way of example only to the accompanying drawings in which.

DETAILED DESCRIPTION OF VARIOUS EMBODIMENTS OF THE INVENTION

Figure 1:
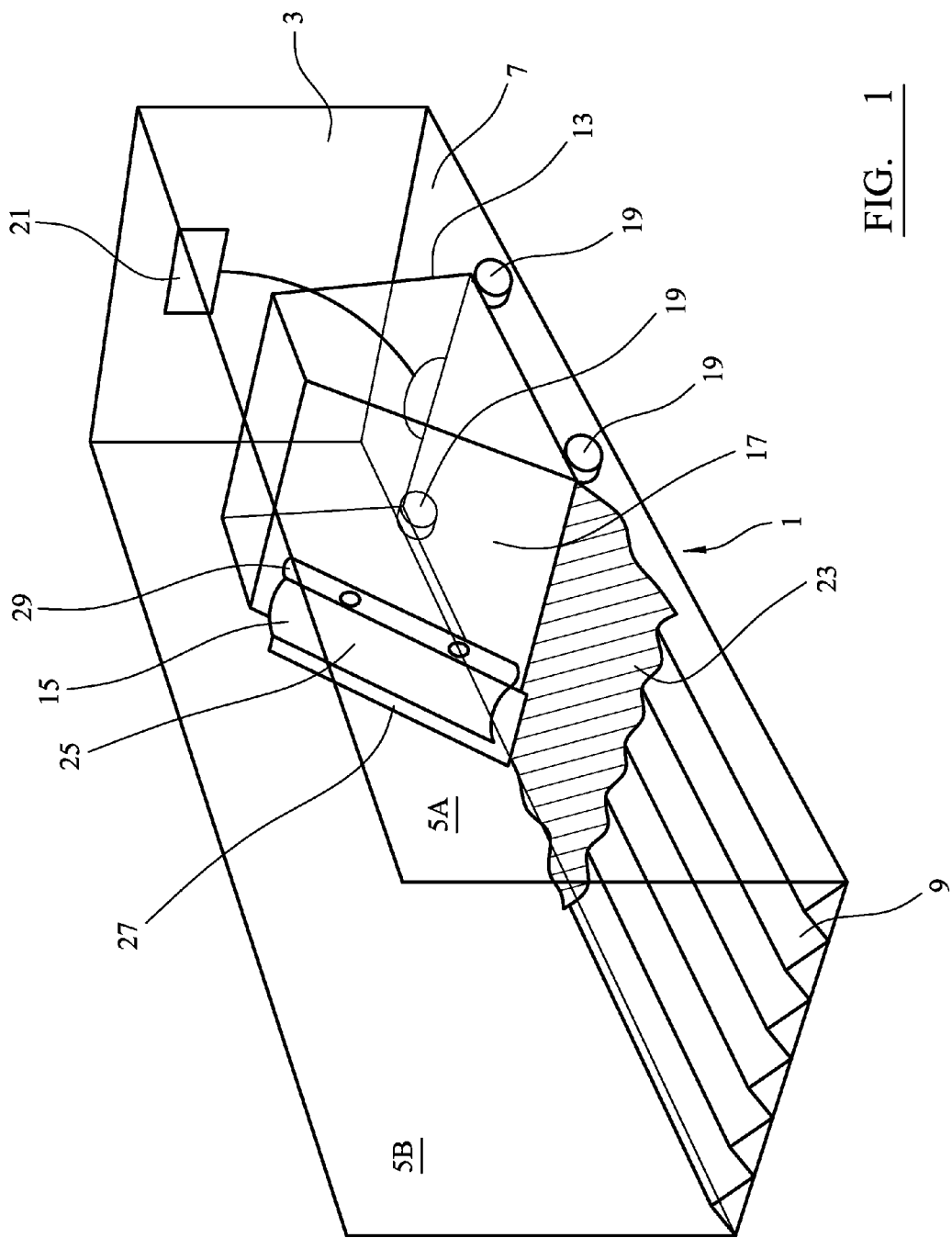
FIG. 1 schematically illustrates a system for removing material from a reciprocating floor container according to embodiments of the invention.

The Figures illustrate an apparatus 15 for removing material from a reciprocating floor container 1 comprising: a first member 25; a flexible sealing portion 27 coupled to the first member 25 and configured to provide a seal between the first member 25 and the container 1; and attachment means 29 configured to enable the first member 25 to be attached to a frame member 13 wherein the attachment means 29 comprises adjustable tension means.

FIG. 1 illustrates a container 1 in which embodiments of the invention may be implemented. The container 1 may be a mobile container or a stationary container. The mobile container may be configured to be attached to a lorry or other suitable vehicle to enable the container 1 and the load within it to be transported.

The container 1 may be used to store or transport a material. The material may comprise particulate material. In some embodiments of the invention the material may comprise coarse particulate material such as aggregate or any other similar material. In some embodiments of the invention the material loaded within the container 1 may be at a high temperature. The container and apparatus according to the invention may be particularly suited to unloading of asphalt or similar materials.

The container 1 also comprises a front end wall 3 and side walls 5A, 5B. The container 1 would also comprise a rear end wall. However it is to be appreciated that this has not been illustrated for clarity. The rear end wall may be opened to enable the load to be removed from the container 1.

The container 1 comprises a floor 7. The floor 7 comprises a plurality reciprocating floor portions 9 which enable a load to be removed from the container without lifting the container by moving the load substantially horizontally through the container 1.

The container 1 comprises a system 11 according to embodiments of the invention. The system 11 comprises a moveable body in the form of a frame member 13 and an apparatus 15 which are described in more detail below.

The frame member 13 may comprise a rigid framework. The frame member 13 may be made of any suitable, typically metallic, material such as aluminium.

The frame member 13 comprises means for enabling the frame member 13 to be moved through the container 1. In the particular embodiment of the invention illustrated in FIG. 1 the means comprise wheels or casters 19 coupled to the frame member 13 which enables the frame member 13 to be dragged through the container 1, along the floor thereof, as the load is removed. The means may also comprise a pulley 21. The pulley 21 may be coupled to the front end wall 3 of the container 1 to enable the frame member 13 to be pulled back towards the front end wall 3.

The frame 13 is configured to provide a front surface or blade 17 which enables the material loaded within the container to be pushed/pulled through the container 1 to reduce the amount of material left behind when the load is emptied. The front surface 17 may be mounted on the frame member 13. The frame member 13 and the front surface 17 may be sized so that the front surface 17 substantially fills the cross sectional area, or at least the lateral distance, between the side walls 5A, 5B of the container 1. However there may be a gap between the front surface 17 and the side walls 5A, 5B. The front surface is thus typically slightly smaller in width than the container. The size of the gap may depend upon a number of factors such as the size of the container 1 used. However the gap is typically a relatively small fraction of the width of the container, such as, for example, less than 0.1 of the width of the container. The size of the gap may increase, for example, if a high temperature material is loaded into the container 1. The increase in temperature may cause the side walls 5A, 5B to expand away the frame member 13.

In some embodiments of the invention a load bearing member 23 may also be provided. The load bearing member 23 may be configured to cover at least a portion of the floor 7 so that the material loaded within the container 1 is placed on top of the load bearing member 23. As the reciprocating floor portions 9 are operated to remove the load from the container 1 the weight of the load on top of the load bearing member 23 moves the load bearing member 23 with the load.

The load bearing member 23 may be coupled to the frame system 13 so that as the load overlying the load bearing member 23 is moved through the container the load bearing member 23 drags the frame member 13.

The load bearing member 23 may comprise a sheet of any suitable material, such as, for example, tarpaulin.

The apparatus 15 comprises a first member 25 and a flexible sealing portion 27.

The apparatus 15 is attached to the side of the frame member 13. In the embodiment illustrated in FIG. 1 only one apparatus 1 is illustrated however it is to be appreciated that other embodiments of the invention more than one apparatus 1 could be coupled to the frame member 13. For example there may be provided one apparatus 15 either side of the frame member 13.

The first member 25 may comprise a rigid member. The rigid member may be made of any suitable material such as aluminium.

The first member 25 may be attached to the frame member 13 by attachment means 29. The attachment means 29 may comprise any means which are configured to enable the first member 25 to be securely attached to the frame member 13. For example the attachment means may comprise nuts and bolts or any other suitable fixing.

In some embodiments of the invention the attachment means 29 may comprise a hinge. The hinge may be configured to enable the apparatus 15 to move relative to the frame member 13. This may make it easier for the apparatus 15 and frame member 13 to be moved through the container. Opposing hinge portions may be allowed to rotate about a common pin. However in alternative embodiments, the first member may otherwise flex relative to the front surface 17 for example by provision of an adjoining material or other flexible interface between the first member 25 and the front surface 17.

In some embodiments of the invention the attachment means 29 may also comprise adjustable tension means 29. The adjustable tension means 29 may comprise any means which enables the apparatus 15 to be forced against the walls 5A, 5B of the container 1. The adjustable tension means may comprise, for example a spring. In other embodiments of the invention other devices such as air or hydraulic damper systems or counter weights or pulleys could be used instead.

The adjustable tension means preferably applies a biasing force to urge the first member 25 outwards relative to the front surface 17. The adjustable tension means may bias the first member 25 to a position in which it is substantially parallel with the front surface 17. The wall of the container may resist such biasing force in use such that the first member is retained at an angle to the front surface 17, thereby maintaining a seal with the adjacent wall of the container. In some embodiments, the hinge itself may be provided with the biasing means, for example by way of a torsion/compression spring arrangement. Additionally or alternatively, the inherent resilience of any material between the first member 25 and the front surface 17 (or frame 13) may provide the desired biasing force, wherein such material tends to return to an at-rest condition in which the first member 25 depends outwardly of the front surface 17.

In any such an arrangement, the tension (i.e. the biasing force) may increase or decrease based on the angular orientation of the first member 25. The tension (i.e. applied biasing force) and the angular orientation may increase and/or decrease in proportion. The relationship between the applied biasing force and the angular orientation may be substantially linear over a desired range of use.

The flexible sealing portion 27 may be provided around the edge of the first member 25 so that, in use, the flexible sealing portion 27 brushes against the floor 7 and side walls 5A, 5B of the container 1. The flexible sealing portion 27 may provide a seal between the first member 25 and the floor 7 and side walls 5A, 5B of the container 1.

The flexible sealing portion 27 may be attached to the first member 25 by any suitable means such as bolts.

The flexible sealing portion 27 may be made of any suitable material such as rubber or any other material which is hard wearing enough to withstand repeated abrasion against the floor 7 and side walls 5A, 5B of the container 1. The flexible sealing portion 27 may also be made of a material which can withstand the high temperatures of loads which may be added to the container 1.

Embodiments of the invention as described above provide an apparatus which may be used to remove material from a reciprocating floor container. The apparatus 15 acts to seal the gap between the edge of the frame member 13 and the floor 7 and side walls 5A, 5B of the container 1. This prevents material from passing through the gap and so reduces the amount of residual material remaining in the container 1 after the load has been emptied.

As the apparatus 15 is attached to the frame member 13 by adjustable tension means this enables the force with which the apparatus 15 is pressed against the floor 7 and/or side walls 5A, 5B of the container 1 to be adjusted. This enables the apparatus 15 to be used in different sized containers or with different sized frame members. This also enables the force to be adjusted to allow for variations in the size of the container 1 due to, for example, a high temperature load being stored in the container 1.

Figure 2:
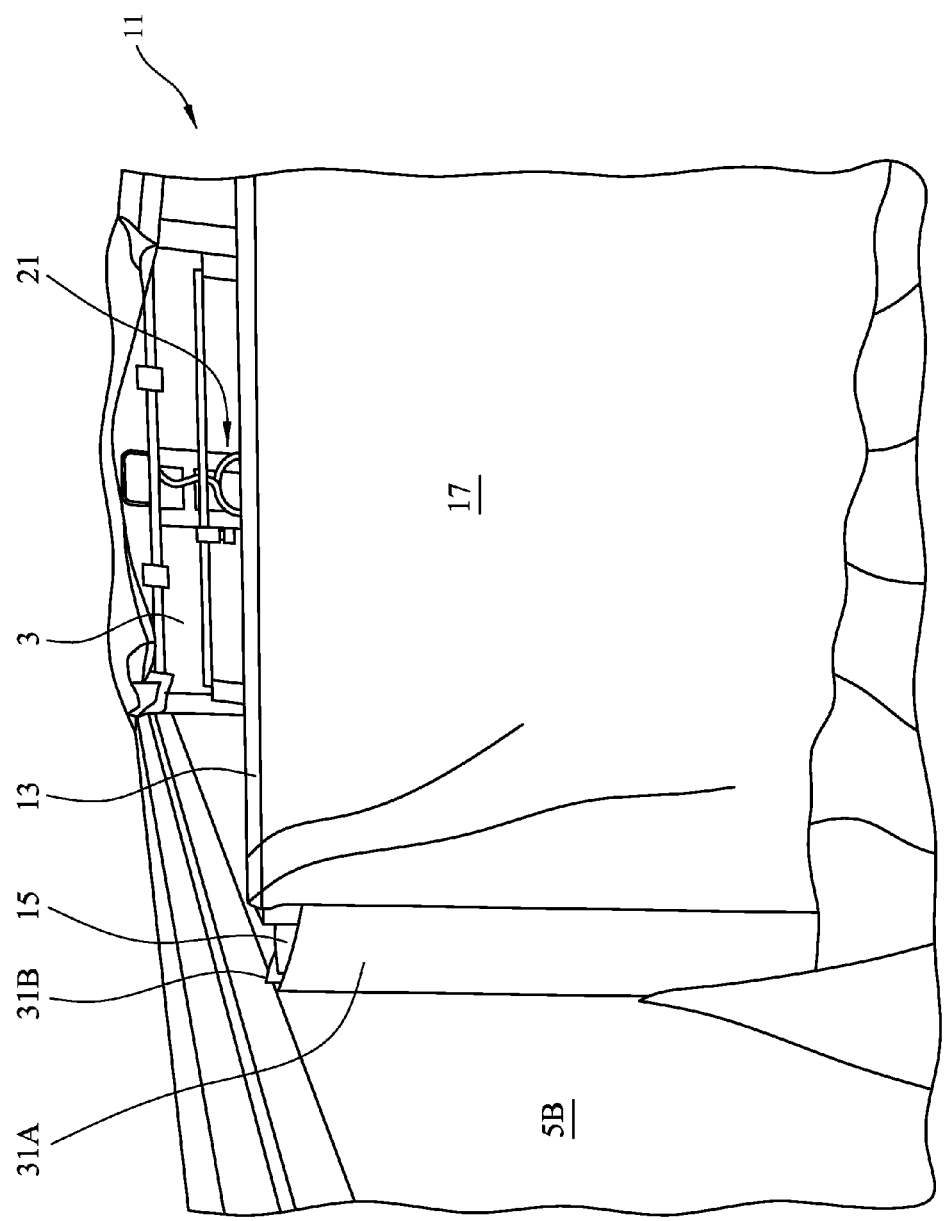
FIG. 2 illustrates a front view of a system in a container according to an exemplary embodiment of the invention.

FIG. 2 illustrates a system 11 in a container according to an exemplary embodiment of the invention. The system 11 comprises a frame member 13 and apparatus 15 within a container 1 as described above in relation to FIG. 1. Corresponding reference numerals are used in FIG. 2 for features corresponding to the system illustrated schematically in FIG. 1.

The system 11 also comprises a first sealing member 31A and a second sealing member 31B. The first sealing member 31A may be attached to the frame member 13 in front of the apparatus 15 and the second sealing member 15 may be attached to the frame member behind the apparatus 15 so that the apparatus 15 is positioned between the two sealing members 31A, B.

The sealing members 31A and 31B may be made of rubber or any other suitable flexible materials. The sealing members 31A and 31B may be flexible enough to bend as the frame member 13 is moved through the container 1. The sealing members 31A and 31B may assist in preventing material passing though the gap between the frame member 13 and the side walls 5A, 5B.

Figure 3:
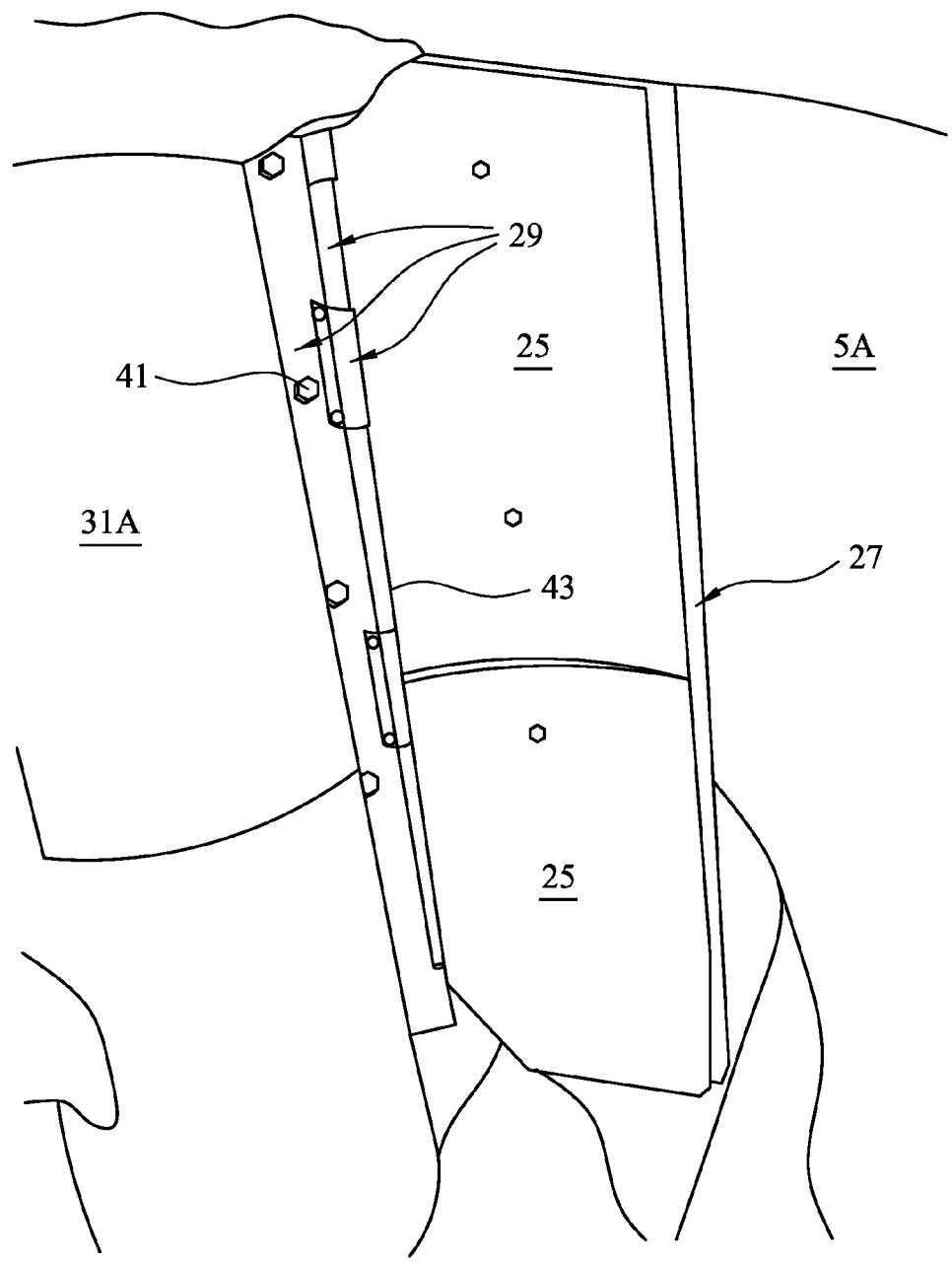
FIG. 3 illustrates a front view of a portion of the apparatus in the embodiment of FIG. 2.

FIG. 3 illustrates a front view of an apparatus 15 in the system 11 illustrated in FIG. 2. Corresponding reference numerals are used in FIG. 3 for features previously illustrated in FIGS. 1 and 2. In FIG. 3 the first sealing member 31A has been moved to enable the apparatus 15 to be viewed. In the exemplary embodiment of FIG. 3 the flexible sealing portion comprises rubber extending along the edge of the first member 25.

In the embodiment illustrated in FIG. 3 the attachment means 29 comprises a bolt portion and a hinge portion 43. The bolt portion 41 enables the apparatus 15 to be securely fixed to the frame member 13. The number and size of bolts used may be determined by the size and weight of the apparatus 12.

The hinge portion 43 enables the apparatus 15 to move backwards as the frame member 13 is moved through the container 1.

Figure 4:
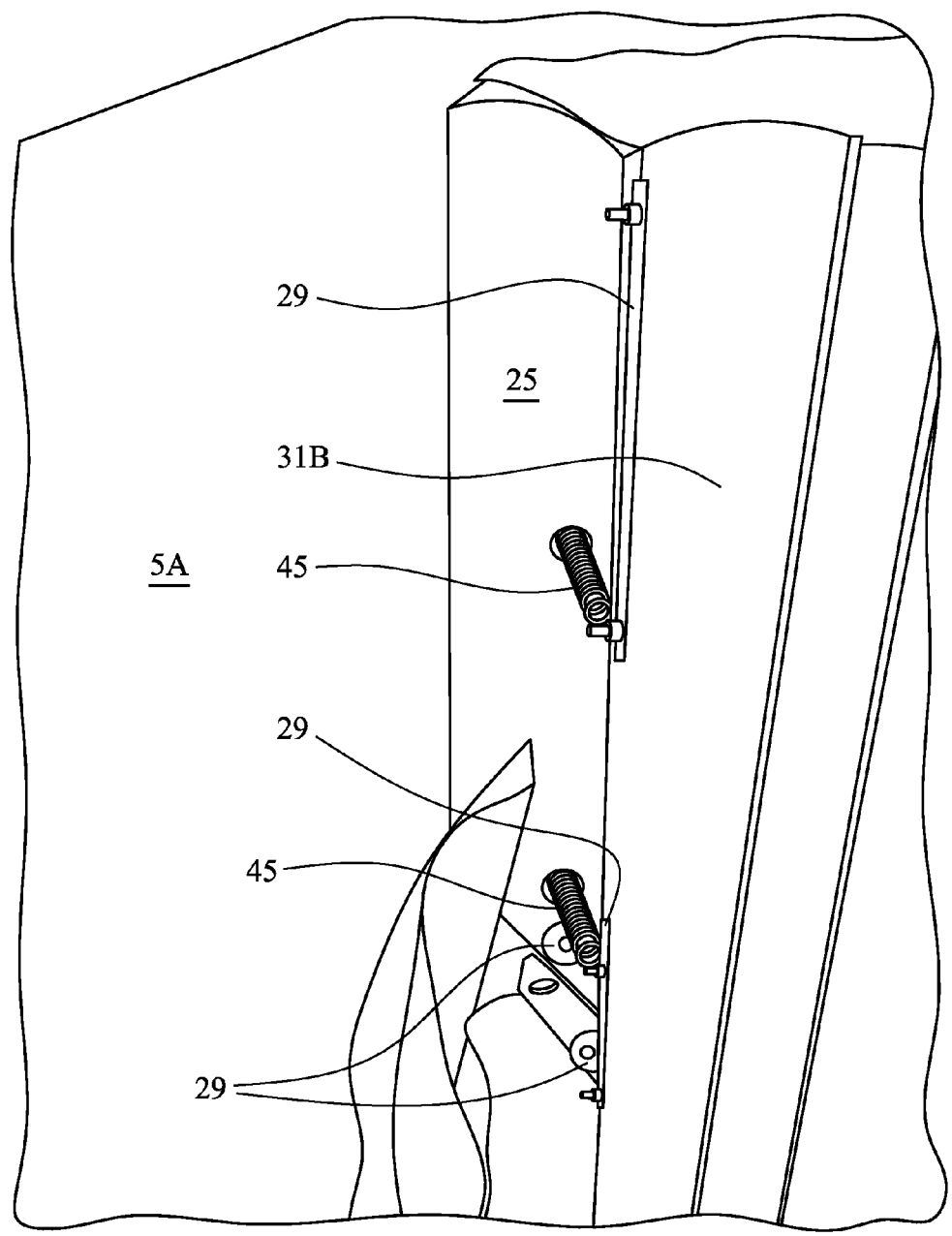
FIG. 4 illustrates a further view of an apparatus in the embodiment of FIG. 2 with the first member pulled away from the frame to show details of the actuation mechanism.

FIG. 4 illustrates a rear portion of an apparatus 15 in the system 11 illustrated in FIG. 2. Corresponding reference numerals are used in FIG. 4 for features previously illustrated in FIGS. 1, 2 and 3. In FIG. 4 the second sealing member 31B has been moved to enable the apparatus 15 to be viewed.

The attachment means 29 comprises a retaining bracket and springs 45. The springs 45 provide an adjustable force which pushes the apparatus 15 against the wall 5A of the container 1. This provides an improved seal between the apparatus 15 and the container 1 and reduces the amount of material left in the container 1. In the embodiment of the invention illustrated in FIG. 4 two springs are provided. The number of springs provided may vary according to the size and weight of the apparatus 15.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described. Although functions have been described with reference to certain features, those functions may be performable by other features whether described or not. Although features have been described with reference to certain embodiments, those features may be present in other embodiments whether described or not.

While endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. An apparatus for removing material from a reciprocating floor container comprising:
    a body arranged to be located in a container to assist in removal of material therefrom, the body comprising a blade suitable for urging material out of the container in use;
    a first member located on a face of the blade and extending along a lateral side of the blade and being hingedly mounted relative to the blade, the first member having a flexible sealing portion configured to provide a seal between the first member and the container, the first member being more rigid than the flexible sealing portion; and
    a biasing arrangement between the body and the first member and configured to bias the first member away from the face of the blade while forcing the flexible sealing portion towards a lateral side wall of the container and towards a floor of the container while material is urged through the container.

2. The apparatus as claimed in claim 1 wherein the biasing arrangement comprises an actuation mechanism for applying an adjustable biasing force to the first member to force the flexible sealing portion against the lateral side wall of the container.

3. The apparatus as claimed in claim 2 wherein the actuation mechanism comprises at least one spring.

4. The apparatus as claimed in claim 1 wherein the first member comprises a rigid member and the flexible sealing portion comprises a further material, the flexible sealing portion being attached to the first member.

5. The apparatus as claimed in claim 4 wherein the rigid member comprises aluminum.

6. The apparatus as claimed in claim 2 wherein the actuation mechanism is arranged to apply a variable biasing force between the first member and the body dependent on a relative spacing or orientation between the first member and the body.

7. The apparatus as claimed in claim 1 wherein the flexible sealing portion is configured to provide a seal between the first member and both of the lateral side wall and a floor of the container.

8. The apparatus as claimed in claim 4 wherein the flexible sealing portion comprises rubber.

9. The apparatus as claimed in claim 1 wherein the first member is arranged to pivot about a lateral side of the body.

10. The system as claimed in claim 9 wherein the first member is arranged to pivot about a lateral side of the body.

11. A system for removing material from a reciprocating floor container comprising:
    a body defining a front surface, comprising means for enabling the body to be moved through the container and a blade at the front surface of the body to enable the material to be urged through the container; and
    at least one apparatus comprising:
    a first member attached to a lateral edge of the blade between the blade and a side surface of the container; and
    a flexible sealing portion coupled to the body on a front surface side of the first member and configured to provide a seal between the first member and the container, wherein the first member is more rigid than the flexible sealing portion and is hingedly mounted relative to the blade by attachment means which comprise a biasing arrangement for forcing the flexible sealing portion towards a lateral side wall of the container and towards a floor of the container while material is urged through the container.

12. The system as claimed in claim 11 wherein one apparatus as claimed is provided at each of two opposed sides of the body.

13. The system as claimed in claim 11 wherein the means for enabling the body to be moved through the container comprises a pulley.

14. The system as claimed in claim 11 wherein the means for enabling the body to be moved through the container comprises wheels coupled to the body.

15. The system as claimed in claim 11 further comprising a load bearing member where at least a portion of the load bearing member is configured to cover a floor of the container so that a load of the container is on top of the load bearing member.

16. The system as claimed in claim 11 wherein a load bearing member is coupled to the body so that as a load is moved out of the container the body is moved with the load.

17. The system as claimed in claim 11 wherein the front surface has a lateral dimension which is substantially equal to, or less than, a lateral distance between side walls of the container such that the front surface substantially fills the container in use.

18. The system as claimed in claim 11 further comprising an additional sealing portion coupled to the body on a side of the first member opposite the flexible sealing portion.

19. A container comprising a system as claimed in claim 11.

* * * * *